United States Patent
Ravich et al.

(10) Patent No.: US 9,917,644 B2
(45) Date of Patent: Mar. 13, 2018

(54) METHOD AND SYSTEM FOR DATA TRANSMISSION AND COMMUNICATION USING IMPERCEPTIBLE DIFFERENCES IN VISIBLE LIGHT

(71) Applicant: Booz, Allen & Hamilton, McLean, VA (US)

(72) Inventors: Vadim Ravich, McLean, VA (US); Andrew Linn, McLean, VA (US); Allan O. Steinhardt, Herndon, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 14/049,681

(22) Filed: Oct. 9, 2013

(65) Prior Publication Data

US 2014/0099107 A1 Apr. 10, 2014

Related U.S. Application Data

(60) Provisional application No. 61/711,299, filed on Oct. 9, 2012.

(51) Int. Cl.
| | |
|---|---|
| *H04B 10/11* | (2013.01) |
| *H04B 10/114* | (2013.01) |
| *H04B 10/116* | (2013.01) |
| *H04B 10/00* | (2013.01) |

(52) U.S. Cl.
CPC ............ *H04B 10/116* (2013.01); *H04B 10/11* (2013.01); *H04B 10/114* (2013.01); *H04B 10/1141* (2013.01); *H04B 10/1143* (2013.01); *H04B 10/1149* (2013.01); *H04B 10/22* (2013.01)

(58) Field of Classification Search
CPC ... H04B 10/11; H04B 10/114; H04B 10/1141; H04B 10/1143; H04B 10/1149; H04B 10/116; H04B 10/22

See application file for complete search history.

(56) References Cited

U.S. PATENT DOCUMENTS

| | | | |
|---|---|---|---|
| 5,838,472 A * | 11/1998 | Welch et al. ................. | 398/151 |
| 2007/0242337 A1* | 10/2007 | Bradley ........................ | 359/237 |
| 2008/0170863 A1* | 7/2008 | Won et al. .................... | 398/172 |
| 2008/0310850 A1* | 12/2008 | Pederson et al. ............. | 398/135 |
| 2009/0297167 A1* | 12/2009 | Nakagawa et al. ........... | 398/182 |
| 2010/0054748 A1* | 3/2010 | Sato ..................... | H04B 10/116 398/130 |

* cited by examiner

*Primary Examiner* — Darren E Wolf
(74) *Attorney, Agent, or Firm* — Buchanan Ingersoll & Rooney PC

(57) ABSTRACT

An exemplary system for communicating data includes a light source that emits light and a processing device that receives and encodes data into a communication signal. A modulator modulates light emitted by the light source, wherein the modulation is imperceptible to the human eye, and the modulated light includes the encoded data. The modulation of the transmitted light is imperceptible to a human eye. A receiving device receives the modulated light and processes the light to decode the encoded signal and obtain the data.

23 Claims, 3 Drawing Sheets

METHOD AND SYSTEM FOR DATA TRANSMISSION AND COMMUNICATION USING IMPERCEPTIBLE DIFFERENCES IN VISIBLE LIGHT

FIELD

The present disclosure relates to the communication of data using light, specifically the communicating of data based on imperceptible changes in the modulation of a visible light source.

BACKGROUND

The ability to use light to transmit information has been known for centuries. For example, the photophone uses modulated sunlight to transmit information, in that the brightness of a reflected beam of light observed at the receiver, varied based on audio-frequency variation in air pressure (e.g., sound wavers) which act upon the mirror. In this design, the transmitter has sunlight reflected off a surface of a over a thin mirror positioned at an end of a speaking tube, as words are spoken the mirror oscillates between convex and concave shapes, altering the amount of light reflected from its surface to the receiver. Another example of known communication techniques using light include Morse code in which the visible on/off switching (e.g., pulsing) of a light source is decoded by an observer to obtain the text information. Other techniques and implementations using modulated light to transmit information are known, however, in each of these techniques the modulation of the light source is perceptible by the human eye, which can enable the communicated data to be compromised.

SUMMARY

The present disclosure provides a description of a systems and methods for communicating data using imperceptible changes in light.

An exemplary lighting system for data communication is disclosed, comprising: a light source configured to emit light; a processing device configured to receive data for communication and generate a signal encoded with the received data; and a modulator configured to modulate light emitted by the light source, wherein the modulation is imperceptible to the human eye, and the modulated light includes the encoded data.

An exemplary lighting system for communicating data is disclosed, comprising: an input device configured to receive data for communication; an encoding device configured to generate a signal encoded with the received data; a light source configured to emit light; a modulator configured to modulate light emitted by the light source, wherein the modulation is imperceptible to the human eye, and the modulated light includes the encoded data; a receiver configured to receive the modulated light signal including the encoded data and convert the received light to a current signal; a decoding device configured to obtain the encoded data from the current signal, decode the encoded data, and perform and identification or authentication based on the decoded data; and an interface configured to generate an output based on a result of the identification or authentication.

An exemplary method for communicating data using light is disclosed, comprising: identifying, by a processing device, data to be communicated; encoding, by the processing device, the data to be communicated into a signal; transmitting light via a light source; modulating, using an optical or electrical signal modulator, the transmitted light to transmit the encoded signal, wherein the modulation of the transmitted light is imperceptible to a human eye; receiving, by a receiving device, the modulated light; identifying, based on imperceptible changes in the modulated light, the encoded signal; and decoding the signal to obtain the encoded data.

BRIEF DESCRIPTION OF THE DRAWING FIGURES

Exemplary embodiments are best understood from the following detailed description when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Figure 1:
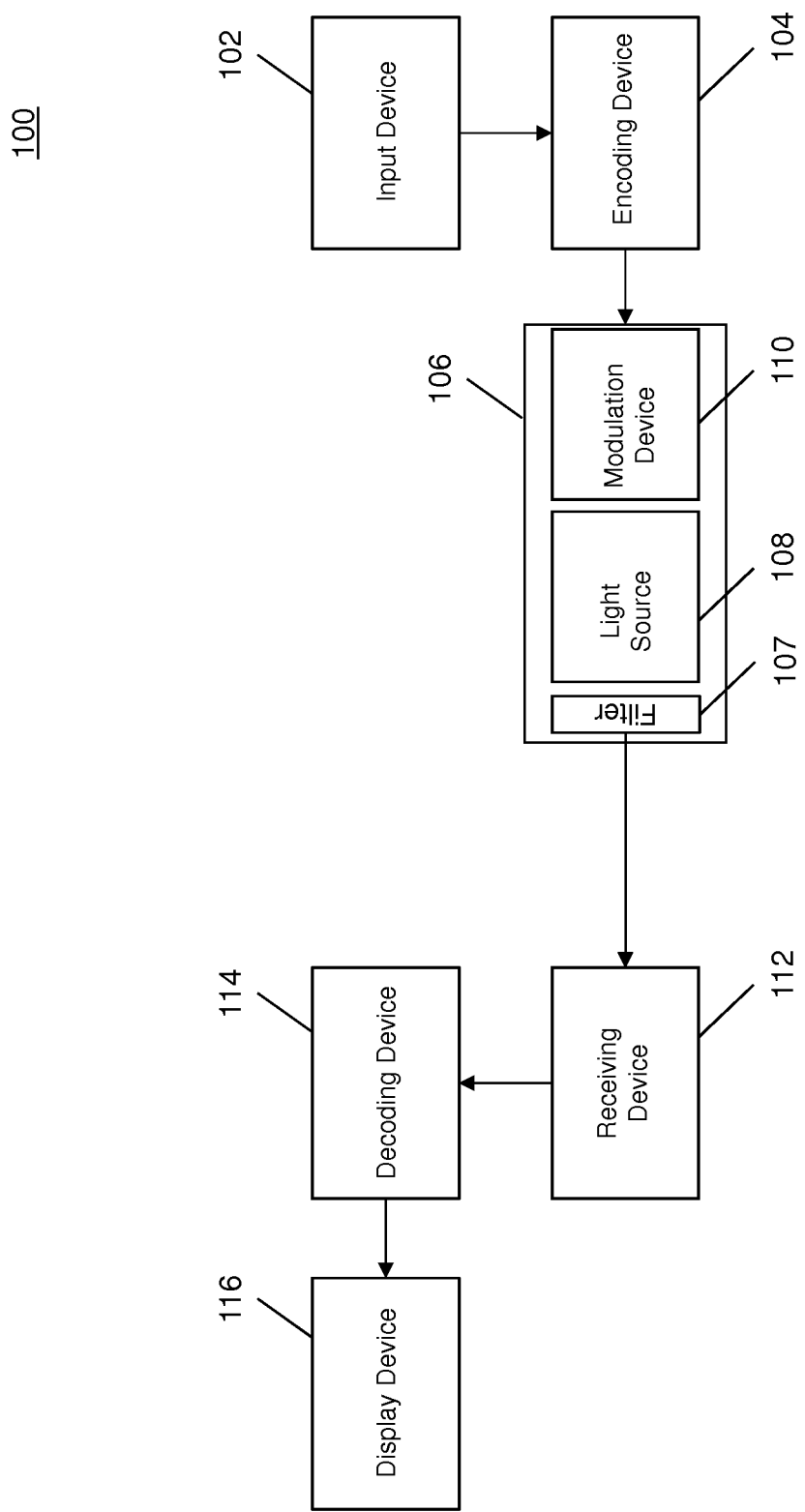
FIG. 1 is a block diagram illustrating a system for communicating data using light in accordance with exemplary embodiments.

FIG. 1 illustrates a system 100 for the communication of data using light. The system 100 may include an input device 102. The input device 102 may be any device configured to receive data for communication. In some embodiments, the input device 102 may be one of: a keyboard and/or mouse, a capacitive touch display, a smart phone, and a laptop computer. In one embodiment, the input device 102 may be a reading device configured to read data to be communicated, such as by contact or contactless communication using a secure element (SE) or nearly any other form of memory, such as the magnetic strip or memory chip on an identity card. For example, the input device 102 may be a card reader and may read data located on a card placed into the reader. In some embodiments, the data to be communicated may be identified based on the input data (e.g., identified in a database as corresponding to authentication information located on the card or input by a user). If used in a vehicle environment, the identity information may be used to authenticate the person for using the vehicle or other related functions, but also used to transmit the user's information through a standard lighting device (e.g., headlamps or nearly any other light associated with the vehicle) to identify the user (or at least the presence of the identity card) and/or the vehicle itself. Other forms of authentication could be used as well.

The data to be communicated may be transmitted to an encoding device 104. The encoding device 104 may be configured to encode the data into a signal. Devices and circuits suitable for encoding the data will be apparent to persons having skill in the relevant art, and may include amplifiers, processors, microprocessors, etc.

In some embodiments, the input device 102 and the encoding device 104 may be a single device. In other embodiments, the input device 102 may transmit the data to the encoding device 104 via a network. Suitable types and configurations of the network will be apparent to persons having skill in the relevant art and may include Near Field Communications (NFC), Bluetooth, radio frequency, infrared, local area network (LAN), wireless area network (WAN), etc.

The encoded signal may then be transmitted to a light 106. The light 106 may include a light source 108 and a modulation device 110. In some embodiments, the modulation device 110 may be separate from the light 106. In a further embodiment, the modulation device 110 may be included in the encoding device 104. In an even further embodiment, the input device 102, the encoding device 104, and the modulation device 110 may be a single device.

The light source 108 may be any type of light source suitable for performing the functions as disclosed herein. In an exemplary embodiment, the light source 108 may be a solid-state light source, such as a light emitting diode (LED). In other embodiments, the light source 108 may be an incandescent light, iridescent light, halogen lamp, compact fluorescent lamp, a light-emitting electrochemical cell, or an infrared lamp. The light source 108 may emit light towards a receiving device 112. In some embodiments, the light source 108 may be directed (e.g., transmitted) in a specific direction or orientation. In one embodiment, the light 106 may include a filter 107 to filter the light emitted by the light source 108 (e.g., to emit a specific wavelength or range of wavelengths). The light source 108 may either be a visible light source or an invisible (e.g., to the human eye) light source.

The modulation device 110 may be any type of device suitable for modulating the light emitted by the light source 108. For example, the modulation device 110 may be a switch configured to turn the light source 108 on and off, a dimmer configured to dim or brighten the light emitted by the light source 108 by a predetermined amount, etc. The modulation device 110 may be implemented using components apparent to persons having skill in the relevant art, such as processors, microprocessors, etc. The modulation device 110 may modulate the light emitted by the light source 108 such that the changes in the light are imperceptible to the human eye. The modulation device 110 may use any modulation technique suitable for performing the functions as disclosed herein, such as frequency-shift keying, phase-shift keying, amplitude-shift keying, on-off keying, quadrature amplitude modulation, continuous phase modulation, etc. More specifically, the modulation technique could be selected from an analog-to-digital converter (if needed) and a square wave formation circuit to drive a power source to the light emitter, but can be much more complex including data security encryption (e.g., RSA 128 bit encryption) in addition to converting the signal into a modulated form suitable for the physical layer transmission. Physical layer modulation includes, by way of example only, such modulation techniques as analog modulation (e.g. AM, FM, PM, QAM, SM, and SSB), digital modulation (e.g., ASK, CPM, FSK, MFSK, MSK, OOK, PPM, PSK, QAM, SC-FDE, TCM) spread spectrum (e.g., CSS, DSSS, FHSS, THSS). The modulation device 110 may modulate the light emitted by the light source 108 such that the modulated light transmits the encoded signal including the data to be communicated.

The receiving device 112 may be configured to receive the modulated light emitted by the light source 108. The receiving device 112 may be any device suitable for performing the functions as disclosed herein, such as a photocell, etc. The receiving device 112 may be configured to convert the received light to a current. In some embodiments, the receiving device 112 may also include a filter, which may be configured to filter out noise based on ambient light or light from external light sources (e.g., the sun, street and parking lot lighting, overhead lighting, etc.). The receiving device 112 may include additional components as will be apparent to persons having skill in the relevant art, such as an amplifier. The receiving device 112 may transmit the processed signal of the emitted light to a decoding device 114.

The decoding device 114 may be configured to decode the signal as received and processed by the receiving device 112. Methods for decoding the signal will be apparent to persons having skill in the relevant art and may be based on the modulation technique employed by the modulation device 110. The decoding device 114 may use any components necessary to decode the signal, such as processor, microprocessors, etc., and obtain the encoded data. The decoding device 114 may then transmit the decoded data to a display device 116, which may display the decoded data to a user. It will be apparent to persons having skill in the relevant art that the receiving device 112 and decoding device 114 may be a single device. In one embodiment, the receiving device 112, the decoding device 114, and the display device 116 may be a single device.

The system 100 may be used to perform one-way or two-way communication of data using light. Suitable applications for the system 100 will be apparent to persons having skill in the relevant art and may vary widely. In one application, the system 100 may be used to authenticate a vehicle. For example, the headlights of a car may emit light that may be modulated using changes imperceptible to the human eye, but which may be read by a receiving device at a security checkpoint (e.g., for a controlled area, on a toll road, etc.). The receiving device may process the modulated light to determine the identity of the vehicle based on the modulation, which may be used for authentication. In some embodiments, the modulation may be specific to the vehicle. In other embodiments, the modulation may alternatively or additionally be specific to the operator of the vehicle, such as by the operator using an identification card or inputting authentication information on an input device 102 in the vehicle. The system 100 may be implemented in an aftermarket device in order to facilitate such an application, such as by installation into the headlight itself (e.g., as an intermediate add-on modulator between the power source and the head lamp, running lights, interior lights, etc.) at the connector to the headlight or other light source, or at the control for the headlights located in the interior of the vehicle.

The light source might be selected because it is a preexisting or common light source (head or running lights, flashlights, room lighting, etc.) that is not typically thought of as being useful for modern communications. Unlike light signally for human observation (e.g., ship-to-ship light signaling using Morse Code), the frequency of the light modulation, whether by on/off modulation of just controlling the light output level occurs at a speed faster that a human can perceive the pulsing or dimming or shifting of the light spectrum. Common electronic sensors, such as video or traffic cameras at common frame rates of 28-36 frames per second, would also not perceive the light signaling. Hence, the light signaling can be accomplished without human or accidental perception but common light sensors and recorders. For instance, the frequency can be in the range of a thousand or more hertz. This means that the photo sensor/receiver has to be specifically tuned or designed to detect the light signal, and most people would not think to inspect the light source for hidden signals, because they are common light sources. This is useful for toll and security gates in a vehicle environment, of example. Further still, the light source and/or receiver might be directional for greater signal to noise ratios and reduced chances of detection.

Other suitable applications of the system 100 will be apparent to persons having skill in the relevant art and may include, for example, the shipping industry, the airline industry, etc.

Figure 2:
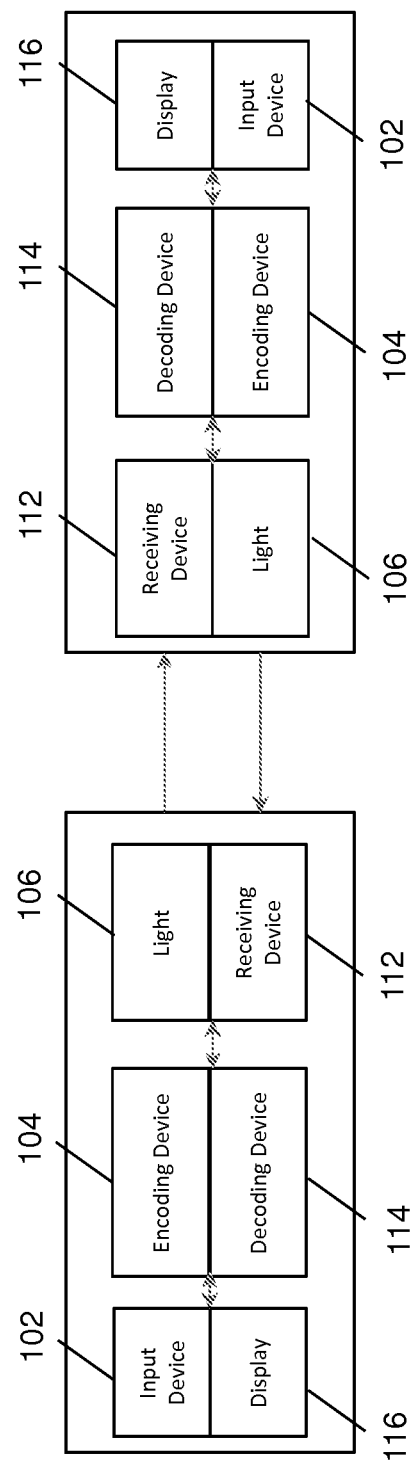
FIG. 2 is a block diagram illustrating the system of FIG. 1 having full and half duplex modes in accordance with exemplary embodiments.

It will be apparent to persons having skill in the relevant art that the system 100 may be configured to perform both half duplex and full duplex communications. FIG. 2 is a block diagram illustrating the system of FIG. 1 having full and half duplex modes in accordance with exemplary embodiments. For example, in a full duplex mode, the input device 102 and the display device 116 may be integrated (e.g., as a computer system with a display and keyboard), the encoding device 104 and the decoding device 114 may be integrated and may be a single device configured to both encode and decode signals, and the light 106 may include both the light source 108 and a receiving device 112, such as a photocell. In such a configuration, each side may be capable of both transmitting data encoded in light by using modulation, and receiving data by receiving modulated light emissions and demodulating and decoding the signal. Methods and configurations for performing both half and full duplex communication using the system 100 or components included therein will be apparent to persons having skill in the relevant art.

Figure 3:
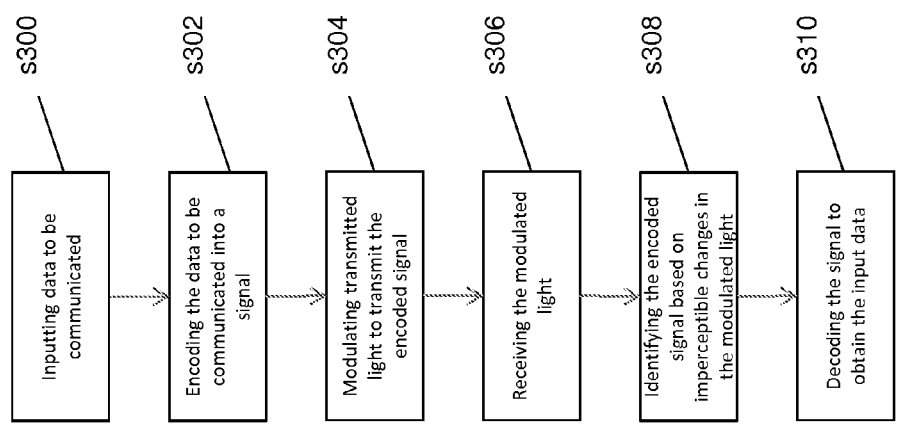
FIG. 3 is a flow diagram illustrating a method for communicating data using light in accordance with exemplary embodiments.

FIG. 3 is a flow diagram illustrating a method for communicating data using light in accordance with exemplary embodiments. In the method, the processing device identifies data to be communicated (s300). The processing device encodes the identified data into a signal (s302). A light source transmits light. A signal modulator (optical or electronic) modulates the transmitted light to transmit the encoded signal, wherein the modulation of the transmitted light is imperceptible to a human eye (s304). A receiving device receives the modulated light signal and filters the received light or converted light signal to reduce noise (s306). The encoded signal is identified based on the changes in the modulated light (s308). A decoder decodes the encoded signal to obtain the input data, wherein the changes are imperceptible to the human eye and conventional optical sensing equipment that might be expected in a given environment (s310).

Techniques consistent with the present disclosure provide, among other features, systems, and methods for the communicating data using imperceptible changes in light. While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A lighting system for data communication, comprising:
   a light source configured to emit light;
   an input device for receiving authentication data, the authentication data being used to modulate the light emitted by the light source;
   a processing device configured to receive data for communication and generate a signal encoded with the received data;
   a modulator configured to modulate light emitted by the light source using the authentication data received by the input device, wherein the modulation is imperceptible to the human eye, undetectable by sensors, includes the encoded signal, and is specific to an operator of a vehicle associated with the light source;
   a receiver tuned and configured to receive the modulated light including the encoded data and convert the received light to a current signal, and identify the operator and the vehicle; and
   a filter for filtering noise from the received modulated light based on ambient light or light from external sources.

2. The lighting system of claim 1, wherein the processing device includes a user interface.

3. The lighting system of claim 2, wherein the processing device is includes at least one of a computer, smart phone, and a display.

4. The lighting system of claim 1, wherein the processing device is a reading device configured to read communicated data.

5. The lighting system of claim 4, wherein the processing device is configured to read data communicated by contact or contactless.

6. The lighting system of claim 1, wherein the authentication information received at the input device is first authentication information and the encoded data includes second authentication information.

7. The lighting system of claim 1, wherein the light source is a solid-state light source.

8. The lighting system of claim 1, wherein the light source is an incandescent light, iridescent light, halogen lamp, fluorescent lamp, a light-emitting electrochemical cell, or an infrared lamp.

9. The lighting system of claim 1, wherein the light source emits visible or invisible light.

10. The lighting system of claim 1, wherein the modulator is configured to modulate light emission using data security encryption.

11. The lighting system of claim 1, wherein the modulator is configured to control the light source to emit light including the data received for communication.

12. The lighting system of claim 1, wherein the modulator is configured to perform high speed modulation of the light source for on/off switching, emission of light pulses, light spectrum switching, and light brightness control.

13. A lighting system for communicating data, comprising:
   an input device configured to receive data for communication;
   an encoding device configured to generate a signal encoded with the received data;
   a light source arranged on a vehicle and configured to emit light;
   an input device for receiving authentication data, the authentication data being used to modulate the light emitted by the light source;
   a modulator configured to modulate light emitted by the light source using the authentication data received at the input device, wherein the modulation is imperceptible to the human eye, undetectable by sensors, includes the encoded signal, and is specific to an operator of the vehicle;
   a receiver tuned and configured to receive the modulated light including the encoded signal and convert the received light to a current signal, the receiver including a filter for filtering noise from the received modulated light based on ambient light or light from external sources, and identify the vehicle based on the modulation;

a decoding device configured to obtain the encoded data from the current signal, decode the encoded data; and an interface configured to generate an output based on the decoded data.

14. The lighting system of claim 13, wherein the system is configured to perform full duplex communication.

15. The lighting system of claim 13, wherein the system is configured to perform half duplex communication.

16. The lighting system of claim 13, wherein the light source emits invisible light.

17. The lighting system of claim 13, wherein the modulator is configured to modulate light emission using data security encryption.

18. The lighting system of claim 13, wherein the modulator is configured to control the light source to emit light including the data received for communication.

19. The lighting system of claim 13, wherein the modulator is configured to perform high speed modulation of the light source for on/off switching, emission of light pulses, light spectrum switching, and light brightness control.

20. The lighting system of claim 13, comprising:
an amplifier for amplifying the current signal.

21. A method for communicating data using light, comprising:
inputting, by a processing device, data to be communicated;

encoding, by the processing device, the data to be communicated into a signal;

inputting authentication data to the processor via an input device;

transmitting light via a light source;

modulating, using the authentication data identifying the light source, the transmitted light to transmit the encoded signal, wherein the modulation of the transmitted light is imperceptible to a human eye, undetectable by sensors and is specific to an operator;

receiving, by a receiving device, the modulated light;

filtering the received light or resulting converted signal from the light to reduce noise from external light sources;

identifying, based on changes in the modulated light that are imperceptible to the human eye, a vehicle associated with the light source and controlled by the operator; and decoding the signal to obtain the encoded data.

22. The method of claim 21, comprising:
amplifying the filtered light prior to obtaining the encoded signal.

23. The lighting system of claim 1, wherein the light source is selected from a group consisting of:
one or more lights on a land or maritime vehicle, a flashlight, one or more lights in a room.

* * * * *